M. W. SEVERANCE & C. C. HEBERT.
CALIPERS.
APPLICATION FILED OCT. 7, 1915.
1,182,715.
Patented May 9, 1916.
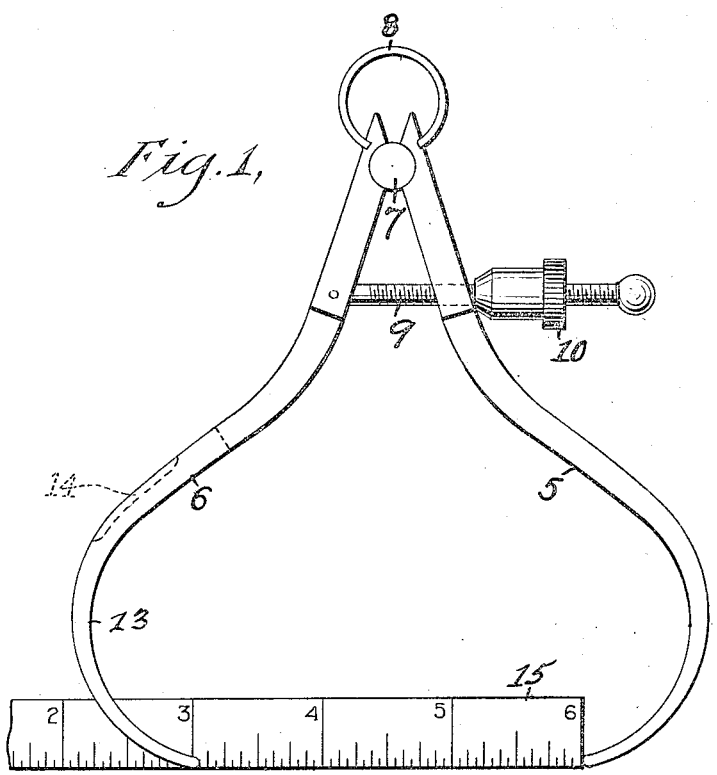
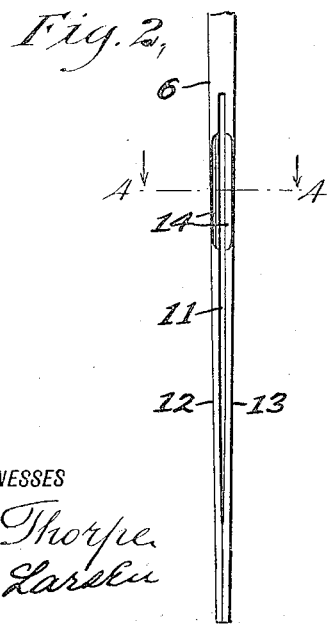
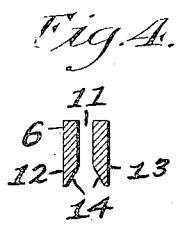
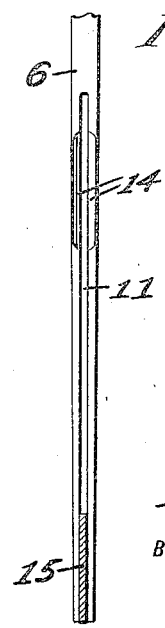
WITNESSES
Edw. Thorpe
J. C. Larsen
INVENTORS
M. W. Severance
C. C. Hebert
BY
ATTORNEYS

UNITED STATES PATENT OFFICE.

MALVERN W. SEVERANCE AND CONRAD C. HEBERT, OF LOWELL, MASSACHUSETTS.

CALIPERS.

1,182,715.   Specification of Letters Patent.   Patented May 9, 1916.

Application filed October 7, 1915. Serial No. 54,595.

*To all whom it may concern:*

Be it known that we, MALVERN W. SEVERANCE and CONRAD C. HEBERT, citizens of the United States, and residents of Lowell, in the county of Middlesex and State of Massachusetts, have invented certain new and useful Improvements in Calipers, of which the following is a specification.

Our invention relates to outside calipers, and the main object thereof is to provide such a tool which is adapted to receive and hold a rule in one of its legs whereby greater ease and accuracy of caliper adjustment is possible than with the conventional calipers.

Our invention is fully described in the following specification, of which the accompanying drawings form a part, in which like characters refer to like parts in each of the views, and in which:—

Figure 1 is a side view of a caliper operatively engaged with a rule, one leg of the caliper being formed in accordance with our invention; Fig. 2 is an edge view of such leg; Fig. 3 is a view similar to Fig. 2 but showing a rule in position for use, said rule being shown in section; and Fig. 4 is an enlarged section taken on the line 4—4 of Fig. 2.

In the drawings forming part of this application we have shown a caliper consisting of legs 5 and 6 pivoted together at 7, a spring 8 tending to force the free ends of the legs apart, and a threaded rod 9 and nut 10 holding the legs in adjusted positions against the action of the spring.

The leg 6 has a longitudinal slot 11 at the outer end thereof forming two members 12 and 13 which normally bear upon each other at their outer ends in a resilient manner due to the natural spring in the metal of which the leg is composed, and we chamfer the adjacent corners of the leg members 12 and 13, as shown at 14, to provide a guideway for the rule or scale 15 which is adapted to be forced between the leg members and to be held therebetween by frictional contact therewith.

As is well known, accurate adjustment of a caliper to desired graduations on a scale is difficult for the reason that the scale and caliper are prone to slip over each other and thus move one previously placed leg away from the particular graduation on the scale before the other leg may be placed upon another desired graduation on the scale in the operation of adjusting the legs with respect to each other. With our caliper, however, the leg 6 is moved along the scale to the desired graduation with the legs spaced well apart, after which the nut 10 is rotated to force the legs toward each other until the end of the scale touches the leg 5, the desired caliper adjustment having thus been attained without the necessity for attempting to keep the eyes on the two legs and the scale at the same time, as with conventional calipers.

Our invention is very simple though highly efficient, overcomes the present vexations in caliper adjustments, saves considerable time, avoids eye strain, and is no more costly than the ordinary calipers.

While we have shown what we believe to be the most simple embodiment of our invention, we do not desire to confine ourselves thereto, but may make changes thereover, within the scope of the following claim, without departing from the spirit of the invention or sacrificing its advantages.

Having fully described our invention what we claim as new, and desire to secure by Letters Patent, is:—

A caliper provided with legs adjustable with respect to each other, one of said legs being slotted to form two members adapted to frictionally hold a rule therebetween, and said slot being outwardly flared at one point to permit the introduction of a rule between said members, to force the latter apart.

In testimony whereof we have signed our names to this specification in the presence of two subscribing witnesses.

MALVERN W. SEVERANCE.
CONRAD C. HEBERT.

Witnesses:
BENJAMIN J. MOLONEY,
JAMES J. KENNEDY.